United States Patent
Meints et al.

(10) Patent No.: US 12,169,207 B2
(45) Date of Patent: Dec. 17, 2024

(54) TEMPERATURE-CONTROLLED SAMPLE INTRODUCTION SYSTEM FOR ANALYSIS OF VISCOUS SAMPLES

(71) Applicant: Elemental Scientific, Inc., Omaha, NE (US)

(72) Inventors: Jeremiah Meints, Elkhorn, NE (US); Maurice Reijnen, Ravenstein (NL)

(73) Assignee: Elemental Scientific, Inc., Omaha, NE (US)

( * ) Notice: Subject to any disclaimer, the term of this patent is extended or adjusted under 35 U.S.C. 154(b) by 907 days.

(21) Appl. No.: 17/127,189

(22) Filed: Dec. 18, 2020

(65) Prior Publication Data

US 2021/0190808 A1   Jun. 24, 2021

Related U.S. Application Data (60) Provisional application No. 62/950,101, filed on Dec. 18, 2019.

(51) Int. Cl.
| | | |
|---|---|---|
| *G01N 35/10* | (2006.01) | |
| *G01N 35/00* | (2006.01) | |
| *G01N 35/02* | (2006.01) | |

(52) U.S. Cl.
CPC .......... *G01N 35/1002* (2013.01); *G01N 35/02* (2013.01); *G01N 35/1095* (2013.01);
(Continued)

(58) Field of Classification Search
CPC .............. G01N 35/1002; G01N 35/02; G01N 2035/00356; G01N 2035/00425; G01N 21/714; G01N 35/1095; G01N 35/10
See application file for complete search history.

(56) References Cited

U.S. PATENT DOCUMENTS

| | | | | |
|---|---|---|---|---|
| 6,021,253 A | * | 2/2000 | Bell | ........................ G01N 35/10 |
| | | | | 392/338 |
| 9,934,953 B1 | | 4/2018 | Saetveit et al. | |
| | | (Continued) | | |

FOREIGN PATENT DOCUMENTS

| | | |
|---|---|---|
| JP | 2001311736 A | 11/2001 |
| JP | 6205918 B2 | 10/2017 |

OTHER PUBLICATIONS

PCT International Search Report and Written Opinion for PCT/US2020/066074, dated Apr. 6, 2021.

*Primary Examiner* — Eman A Alkafawi
*Assistant Examiner* — Dilara Sultana
(74) *Attorney, Agent, or Firm* — Kevin E. West; Advent, LLP (57) ABSTRACT

A sample introduction system is described that provides temperature-controlled handling and transfer of a sample from an autosampler, through a transfer line, to a heated environment proximate an analytical device. A system embodiment includes, but is not limited to, an autosampler including a temperature-controlled deck to support one or more sample containers; a heating unit including one or more heating elements to one or more fluids to be introduced to a sample removed from the one or more sample containers; a transfer line fluidically coupled with the autosampler and including a heating element configured to transfer heat to fluid flowing through the transfer line; and a sample handling system fluidically coupled with the transfer line and configured to fluidically couple with an analysis device, the sample handling system including a housing and a heating element configured to control a temperature of an environment defined by the housing.

18 Claims, 8 Drawing Sheets

(52) U.S. Cl.
CPC .............. *G01N 2035/00356* (2013.01); *G01N 2035/00425* (2013.01)

(56) References Cited

U.S. PATENT DOCUMENTS

| | | | |
|---|---|---|---|
| 10,465,853 B2 | 11/2019 | Wiederin et al. | |
| 2004/0203175 A1* | 10/2004 | Li | G01N 30/84 422/503 |
| 2008/0044311 A1* | 2/2008 | Iguchi | G01N 35/1009 422/63 |
| 2009/0020696 A1* | 1/2009 | Bier | G01N 1/00 250/288 |
| 2014/0315324 A1* | 10/2014 | Meysami | G01N 1/28 422/501 |
| 2015/0217291 A1* | 8/2015 | Wilson | G05B 13/02 435/303.1 |
| 2016/0122808 A1* | 5/2016 | Ammann | C12Q 1/6832 435/6.11 |
| 2017/0219614 A1* | 8/2017 | Cook | G01N 35/10 |
| 2019/0346410 A1 | 11/2019 | Guzzonato et al. | |

\* cited by examiner

TEMPERATURE-CONTROLLED SAMPLE INTRODUCTION SYSTEM FOR ANALYSIS OF VISCOUS SAMPLES

BACKGROUND

Inductively coupled plasma (ICP) mass spectroscopy is an analysis technique commonly used for the determination of trace element concentrations and isotope ratios in liquid samples. ICP mass spectroscopy employs electromagnetically generated partially ionized argon plasma which reaches a temperature of approximately 7000K. When a sample is introduced to the plasma, the high temperature causes sample atoms to become ionized or emit light. Since each chemical element produces a characteristic mass or emission spectrum, measuring said spectra allows the determination of the elemental composition of the original sample.

Sample introduction systems may be employed to introduce the liquid samples into the ICP mass spectroscopy instrumentation (e.g., an inductively coupled plasma mass spectrometer (ICP/ICPMS), an inductively coupled plasma atomic emission spectrometer (ICP-AES), or the like) for analysis. For example, a sample introduction system may withdraw an aliquot of a liquid sample from a container and thereafter transport the aliquot to a nebulizer that converts the aliquot into a polydisperse aerosol suitable for ionization in plasma by the ICP mass spectrometry instrumentation. The aerosol is then sorted in a spray chamber to remove the larger aerosol particles. Upon leaving the spray chamber, the aerosol is introduced to the ICPMS or ICPAES instruments for analysis. Often, the sample introduction is automated to allow a large number of samples to be introduced into the ICP mass spectroscopy instrumentation in an efficient manner.

SUMMARY

A sample introduction system is described that provides temperature-controlled handling and transfer of a sample from an autosampler, through a transfer line, to a heated environment proximate an analytical device. A system embodiment includes, but is not limited to, an autosampler including a temperature-controlled deck to support one or more sample containers; a heating unit including one or more heating elements to one or more fluids to be introduced to a sample removed from the one or more sample containers; a transfer line fluidically coupled with the autosampler and including a heating element configured to transfer heat to fluid flowing through the transfer line; and a sample handling system fluidically coupled with the transfer line and configured to fluidically couple with an analysis device, the sample handling system including a housing and a heating element configured to control a temperature of an environment defined by the housing.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DRAWINGS

The Detailed Description is described with reference to the accompanying figures.

DETAILED DESCRIPTION

Overview

ICP spectroscopy instrumentation may be used to analyze viscous samples, such as edible oils, hard fats, and the like. Viscous samples can present challenges for sample analysis, since many samples solidify or increase in viscosity at traditional room temperatures, causing the samples to become difficult to move or to become non-homogenized prior to analysis. For example, when multiple samples are available for analysis, an autosampling system (e.g., an autosampler) can be used to automatically draw samples from vials or other containers for transfer to an analysis system. As the samples are present at the autosampler, the likelihood that a given sample will solidify or increase in viscosity can increase over time. If samples that are later in a sample queue are permitted to partially solidify while waiting for the autosampler to remove the sample from the sample vial, the composition of the sample may not reflect the composition of the initial sample first presented to the sample vial. Additionally, samples that are initially in a liquid state may begin to solidify during transfer to a sample analysis device. The sample handling system may clog due to increased viscosity of samples, may decrease the flow rate of sample passed through sample tubing due to increased viscosity of samples resulting in lower throughput of sample analysis, or provide other challenges in handling and accurate sample analysis.

Accordingly, in one aspect, the present disclosure is directed to systems and methods for controlling transfer of viscous fluid-containing samples, such as oils, hard fats, and the like, and preparation of the samples for introduction to an analysis device to determine analytic composition of the samples. For example, a system can include an autosampler with a temperature-controlled sample deck to support one or more sample containers configured to hold sample(s) in a fluid state while awaiting analysis, for example, by preventing significant increases in viscosity of the samples during sample pendency on the sample deck (e.g., waiting for the autosampler probe to remove individual samples from respective containers). A temperature-controlled sample transfer line is coupled between the autosampler and a sample introduction system (e.g., a sample handling system), and is configured to transfer heat to fluid flowing through the transfer line to maintain the sample in the fluid state. The sample introduction system conditions a sample prior to introduction to the analysis device, and can include a temperature-controlled environment for one or more pumps, spray chambers, nebulizers, valves, or other fluid-handling devices through which the sample passes before being introduced to the sample analysis device (e.g., introduced to an ICP torch of ICP spectroscopy instrumentation). In an implementation, the sample introduction system includes a housing with a pump, nebulizer, and valve supported therein and a blower system configured to introduce heated air within the housing to maintain a threshold temperature within the housing.

In another implementation, a method can include heating a sample held in a sample container positioned on a deck of an autosampler to maintain the sample in a fluid state, and removing, via a sample probe, the sample in the fluid state from the sample container. The sample is introduced in the fluid state to a transfer line in fluid communication with the sample probe, and transferred in the fluid state through the transfer line to a sample introduction system. The transfer line is heated during transfer of the sample to maintain the sample in the fluid state during transfer from the autosampler to the sample introduction system. An environment defined by a housing of the sample introduction system is heated while the sample is received from the transfer line in the fluid state, and the sample is transferred from the housing of the sample introduction system to a sample analysis device for analytic determination of one or more components in the sample. In an implementation, the temperature of another fluid(s) that are to be brought into contact with the sample is controlled to prevent a significant temperature gradient or gap between the fluid flow(s) and sample flow(s). For example, the fluid is heated prior to introduction of the fluid to the sample to form a mixed sample in the fluid state. Such fluids may be introduced to the sample in the sample container positioned on the deck of the autosampler, or subsequent to removing the sample from the sample container.

In the following discussion, an example environment is first described. Example functionality is then described that may be implemented by the sample introduction system in the exemplary environment, as well as in other environments without departing from the spirit and scope thereof.

Example Implementations

Referring generally to FIGS. 1 through 5, systems 100 are shown for controlling sample transfer and handling conditions from sample uptake through sample analysis at an analysis device. The system 100 can be utilized to facilitate transfer and handling of viscous samples by controlling the temperature of one or more components of the system 100, which can maintain a substantially fluid state of the sample during transfer and handling. The system 100 shown in FIG. 1 includes an autosampler 102, a transfer line 104, a sample introduction system 106, and an analysis device 108 in a fluidically coupled arrangement and communicatively connected with a system controller 110. In general, a plurality of fluid-containing samples is held in sample containers supported on a deck or surface of the autosampler 102, where a probe of the autosampler 102 is positioned above respective sample containers to draw the samples into a fluid line coupled with the transfer line 104 through action of a pump, vacuum, or fluid moving device. The transfer line 104 is coupled between the autosampler 102 and the sample introduction system 106 to transfer the sample drawn from the sample container by the probe to the sample introduction system 106, where the sample is conditioned for analysis prior to transfer to the analysis device 108. In an implementation, each of the autosampler 102, the transfer line 104, and the sample introduction system 106 includes a heating element configured to control a temperature of the respective portion of the system 100 to facilitate transfer of viscous samples through the system 100 by, for example, maintaining the samples in a fluid state. The heating element of the respective portions of system 100 can be controlled by a controller local to the respective portions, by the system controller 110, or combinations thereof.

Figure 1:
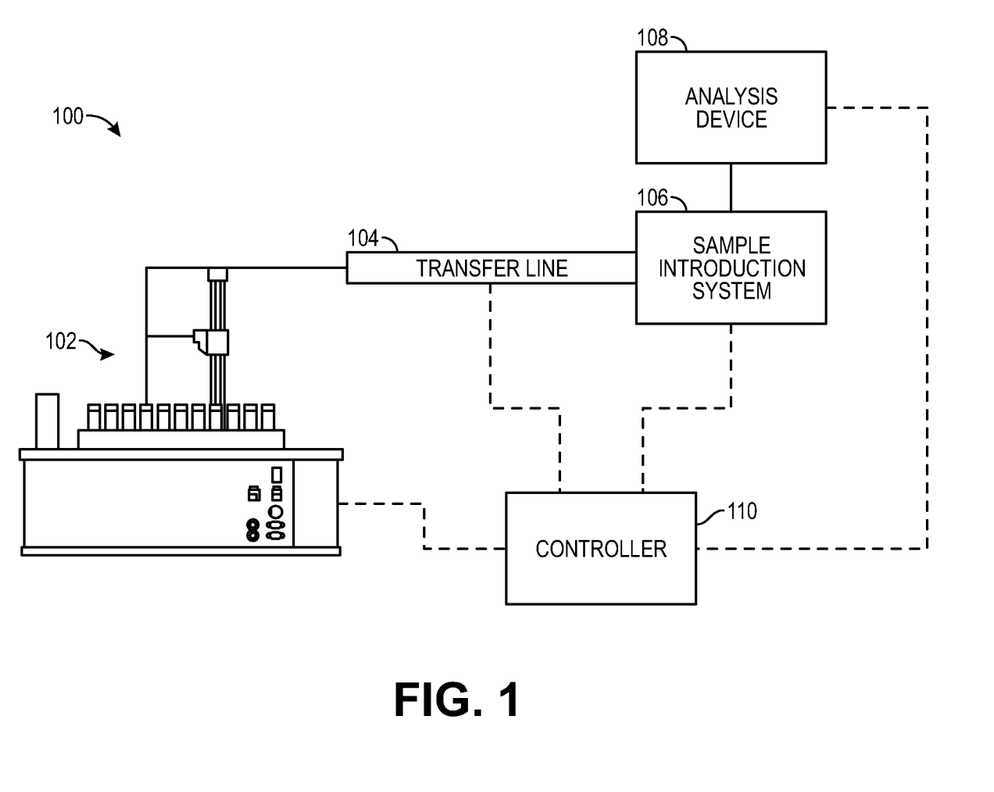
FIG. 1 is an illustration of a temperature-controlled system for handling and preparing samples for analysis in accordance with example implementations of the present disclosure.
Figure 2A:
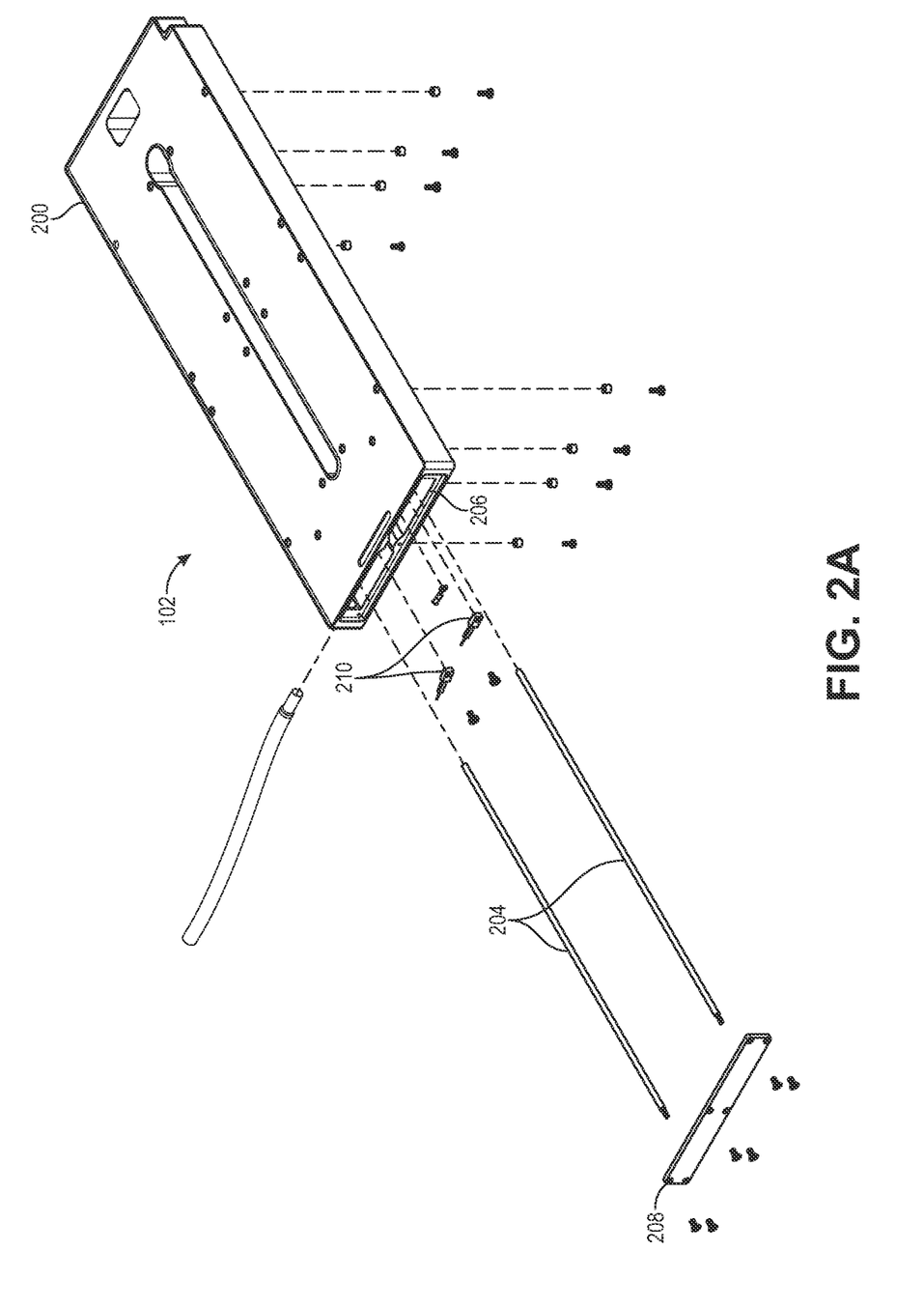
FIG. 2A is an exploded view of a temperature-controlled autosampler deck in accordance with example implementations of the present disclosure.
Figure 2B:
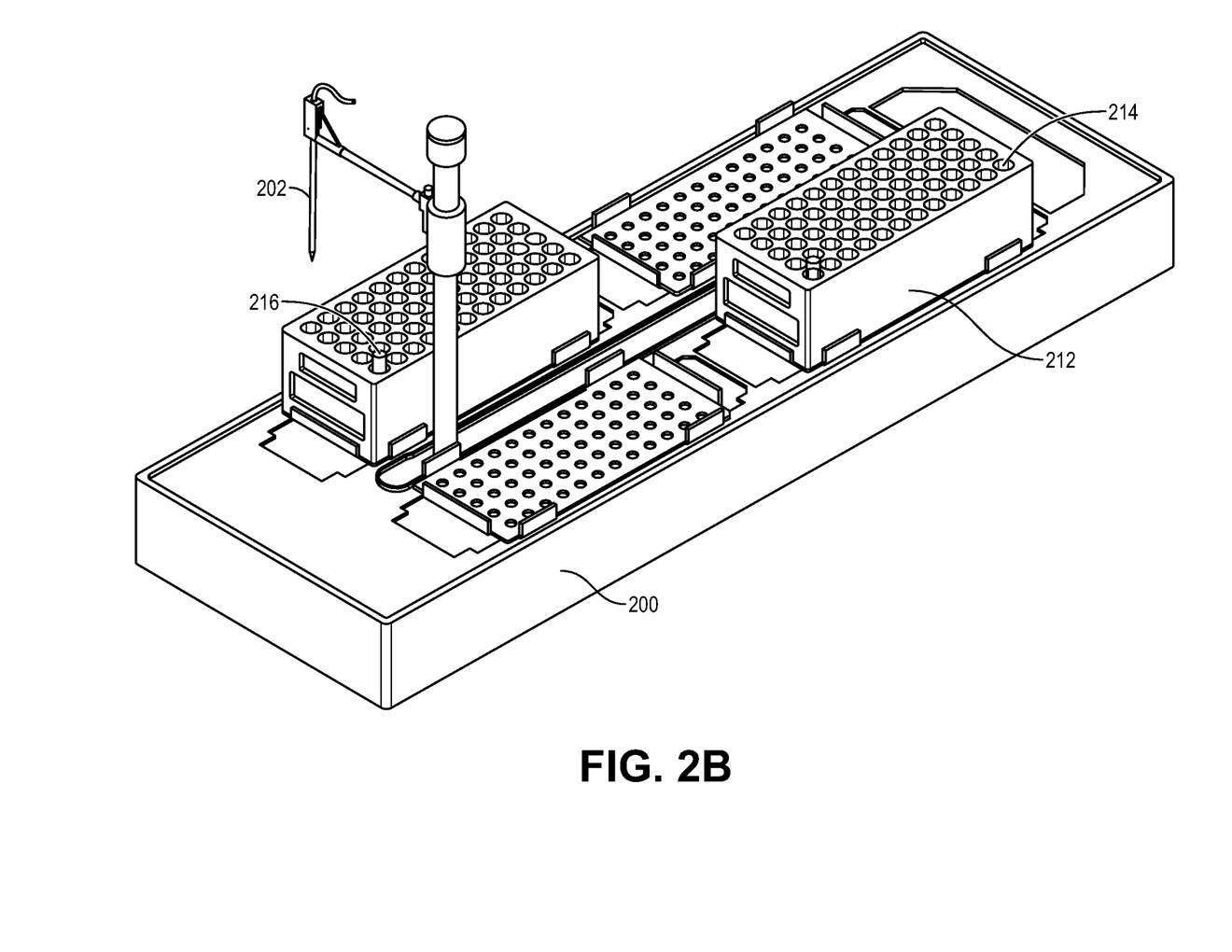
FIG. 2B is an isometric view of a temperature-controlled autosampler with sample racks and containers supported on the deck in accordance with example implementations of the present disclosure.
Figure 2C:
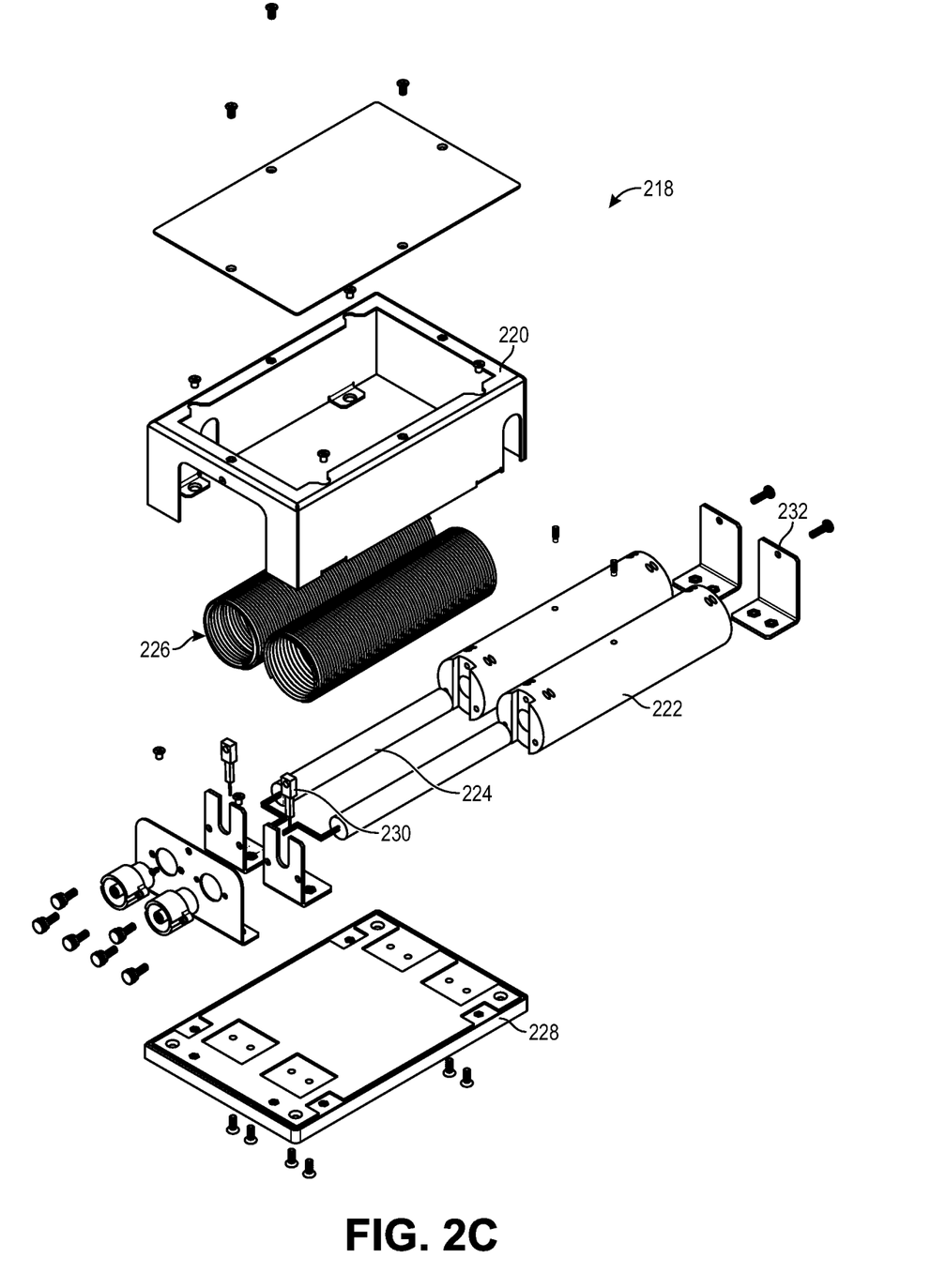
FIG. 2C is an exploded view of a portion of a temperature-controlled autosampler having heated fluid lines to introduce heated fluids to a sample in accordance with example implementations of the present disclosure.

Referring generally to FIGS. 2A through 2C, portions of the autosampler 102 are described in accordance with example implementations. FIG. 2A shows a temperature-controlled deck 200 of the autosampler 102 upon which sample containers, sample racks, or the like are supported for access by a sample probe 202 (e.g., shown in FIG. 2B). The deck 200 is formed from a heat transfer material to facilitate heating samples directly or indirectly supported by the deck 200. For example, the deck 200 can include materials including, but not necessarily limited to: aluminum, tungsten, nickel, titanium, metal alloys, graphite, heat resistant plastic, and so forth, and combinations thereof. The deck 200 is thermally coupled with one or more heating elements 204 that can regulate a temperature of the deck 200 and transfer heat to the samples supported by the deck 200. The heating elements 204 can include, but are not limited to, electric cartridge heaters that generate heat in response to electrical resistance of the materials forming the cartridge heater. In an implementation, the deck 200 forms an aperture 206 into which the heating elements 204 are inserted to substantially enclose the heating elements 204 within the deck 200. An end plate 208 covers the aperture 206 to provide an enclosed temperature regulation environment within the deck 200, which can prevent direct contact of individuals or structures with the heating elements 204, and the like.

The deck 200 can include one or more features to monitor and control the temperature of the deck 200. For instance, the deck 200 can include one or more thermocouples 210 to monitor the temperature of the material of the deck 200, the heating elements 204, or another portion of the deck 200. The thermocouples 210 or other temperature or heat sensor can be communicatively coupled with a controller to control the deck 200 to maintain the samples in the fluid state. For example, the output of the thermocouples 210 or other temperature or heat sensor can be transmitted to the controller 110 or another controller to coordinate operation of the heating elements 204 to provide a desired temperature of the deck 200.

Referring to FIG. 2B, the deck 200 is shown supporting heat-conductive sample holders 212 defining apertures 214 into which sample containers 216 (e.g., vials, tubes, etc.) are inserted for access by the sample probe 202. The sample holders 212 can be formed from the same materials as the deck 200, a different heat transfer material, or the like to transfer heat from the deck 200 to the sample containers 216 supported thereby. Samples, such as edible oils, hard fats, or the like, can be positioned within the sample containers 216, where the deck 200 transfers heat from the heating elements 204 to maintain the samples in a substantially liquid state.

Referring to FIG. 2C, the autosampler 102 or another portion of the system 100 can include a heating unit 218 to control the temperature of other fluids to be used by the system 100 to prepare a sample taken up by the probe 202 for analysis by the analysis device 108. For instance, the heating unit 218 can control the temperature of fluids that are to be brought into contact with the sample to prevent a significant temperature gradient or gap between the fluid flow(s) and sample flow(s) that could cause the sample to increase in viscosity, solidify, etc. The heating unit 218 is shown including a housing 220 that supports one or more heating blocks 222 heated by one or more cartridge heaters 224. The cartridge heaters 224 can include, but are not limited to, electric cartridge heaters that generate heat in response to electrical resistance of the materials forming the cartridge heater. The heating blocks 222 can transfer heat from the cartridge heaters 224 to fluids held in fluid lines 226 (e.g., tubing) passed by the heating blocks 222. Two fluids lines 226 are shown to facilitate temperature control of two fluids simultaneously, however the system 100 is not limited to two fluid lines 226 and can include more than two fluid lines 226 or fewer than two fluid lines 226. The fluids introduced to the fluid lines 226 can include fluids used in the system 100 to generate calibration curves at the analysis device 108, to combine with or interact with samples taken by the probe 202, or the like. For example, the fluids can include, but are not limited to, diluents, internal standards, chemical spikes, working fluids (e.g., to push a sample taken by the sample probe 202 through the system 100), etc.

The fluid lines 226 can be wound around or otherwise brought into proximity of the heating blocks 222 to control a temperature of fluid held by, or passed through, the fluid lines 226. The fluid lines 226 are shown in FIG. 2C as being coils to be positioned around the heating blocks 222 (e.g., positioned about an exterior surface of the heating blocks 222). The heating blocks 222 can be supported within the housing 220 by a base 228 (e.g., secured by one or more mounts 232). The heating unit 218 can include one or more features to monitor and control the heat transferred to the fluid lines 226. For instance, the heating unit 218 can include one or more thermocouples 230 to monitor the temperature of the material of the heating blocks 222, the cartridge heaters 224, or another portion of the heating unit 218. The thermocouples 230 or other temperature or heat sensor can be communicatively coupled with a controller to control the temperature of the fluids within the fluid lines 226. For example, the output of the thermocouples 230 or other temperature or heat sensor can be transmitted to the controller 110 or another controller to coordinate operation of the cartridge heaters 224 to provide a desired temperature of the fluid(s) within the fluid lines 226. The heating unit 218 can be coupled with the autosampler 102 (e.g., positioned beneath or otherwise adjacent to the deck 200) or can be located remote from the autosampler 102.

Figure 3A:
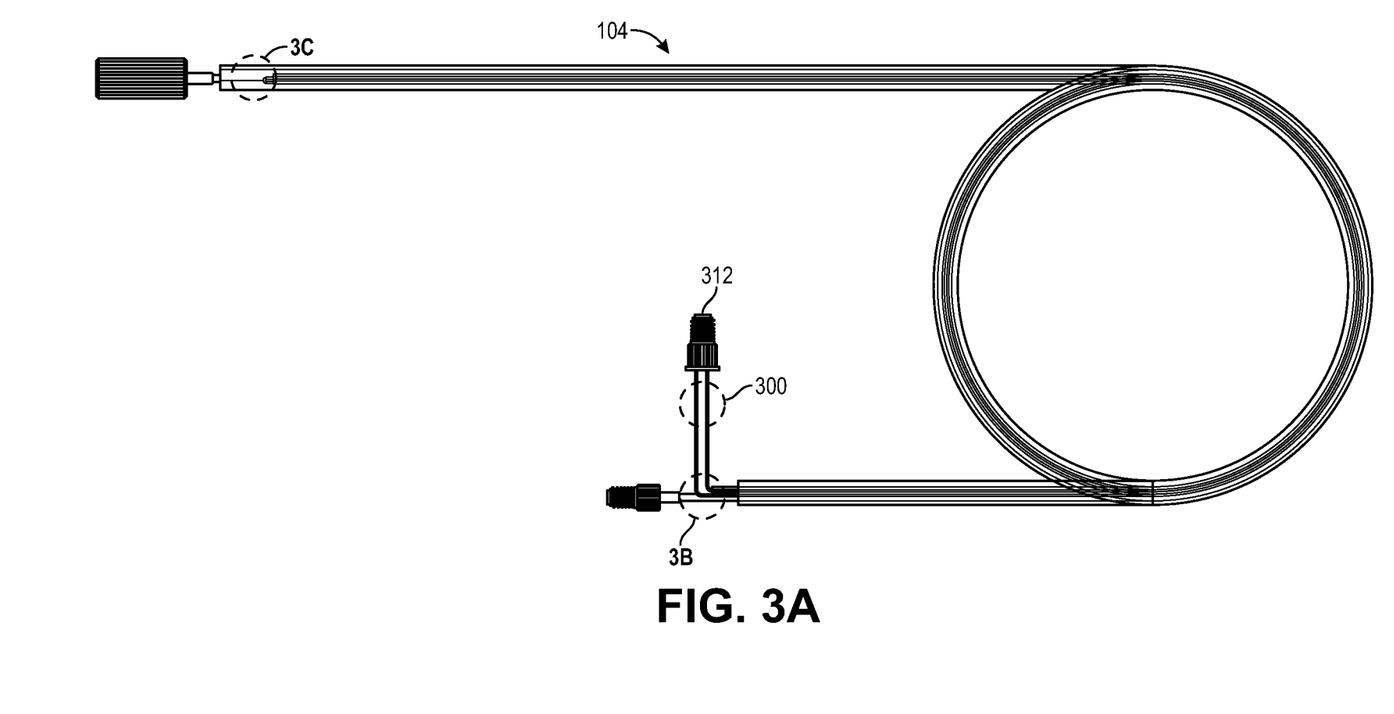
FIG. 3A is a side view of a temperature-controlled fluid transfer line in accordance with example implementations of the present disclosure.
Figure 3B:
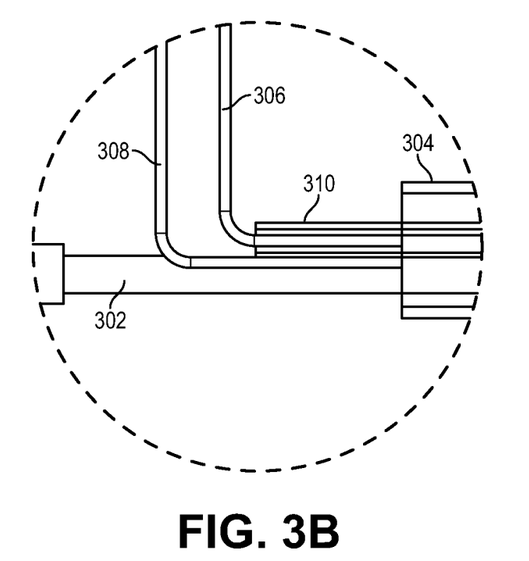
FIG. 3B is a partial view of an end of the temperature-controlled fluid transfer line of FIG. 3A.
Figure 3C:
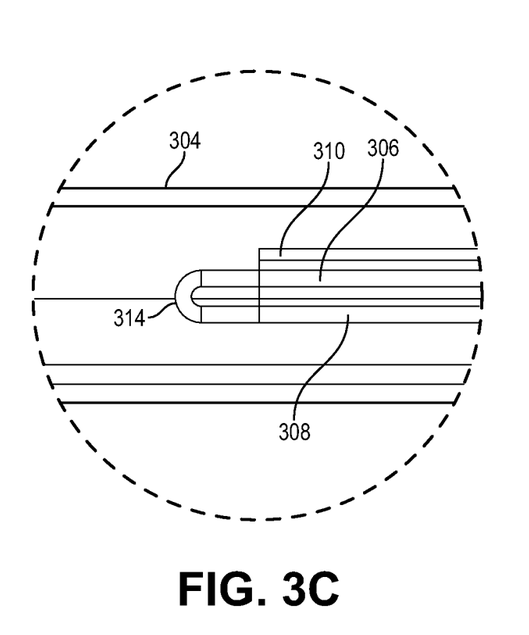
FIG. 3C is a partial view of an end of the temperature-controlled fluid transfer line of FIG. 3A.

Referring generally to FIGS. 3A through 3C, portions of the transfer line 104 are described in accordance with example implementations. The transfer line 104 is configured to receive one or more fluids from the autosampler 102, the heating unit 218, or other portion(s) of the system 100 to transfer the fluids, under temperature control, to the sample introduction system 106. For example, the transfer line 104 can include a heating element 300 in proximity with a fluid line 302 to transfer heat from the heating element 300 to fluid held by and transferred through the fluid line 302. In an implementation, the transfer line 104 includes an outer tube 304 surrounding the fluid line 302 and wires of the heating element 300 to enclose components of the transfer line 104 and separate the components from the surrounding environment. For instance, the fluid line 302 and wires of the heating element 300 are disposed within an interior of the outer tube 304. The heating element 300 can include a wire through which a voltage is applied to generate heat based on the resistive properties of the wire. For example, the heating element 300 can include a first wire 306 (e.g., a resistance wire) separated from a second wire 308 (e.g., a non-resistance wire) by an inner tube 310, with terminal ends of the first wire 306 and the second wire 308 being connected (e.g., by solder 314 as shown in FIG. 3C) and opposing ends introduced to a voltage source (e.g., via connector 312). In an implementation, the first wire 306 is a resistive wire contained within the inner tube 310 and the second wire 308 is positioned within the outer tube 304 exterior to the inner tube 310, such as adjacent the fluid line 302, to position the inner tube 310 between the first wire 306 and the second wire 308. The controller 110 or another controller can coordinate operation of the heating element 300 to apply a voltage to the first wire 306 suitable to achieve a threshold temperature of, or heat transfer to, fluid contained within the fluid line 302. Fluid received at a first end of the transfer line 104 (e.g., into the fluid line 302) is transferred through the transfer line 104 to a second end of the transfer line 104 coupled with the sample introduction system 106 (e.g., through operation of one or more pumps, vacuum sources, or the like).

Figure 4:
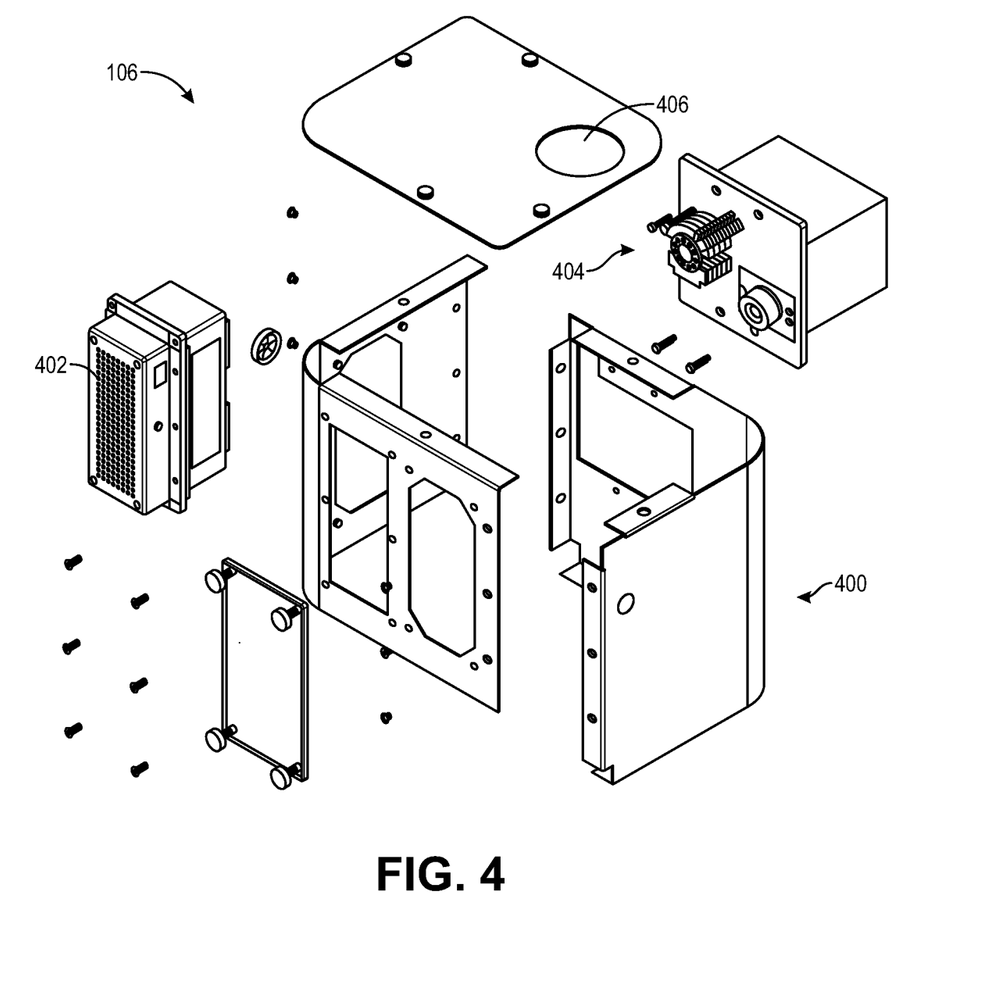
FIG. 4 is an exploded view of a portion of an enclosed, temperature-controlled sample introduction system in accordance with example implementations of the present disclosure.
Figure 5:
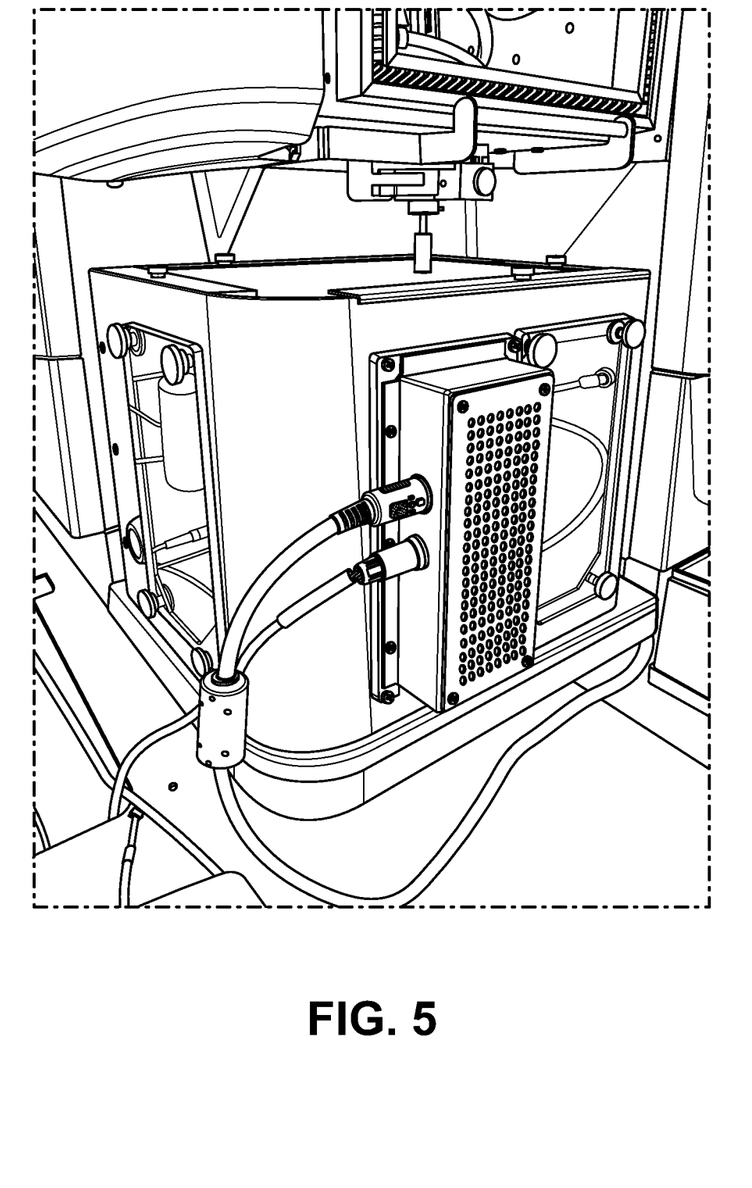
FIG. 5 is a view of an enclosed, temperature-controlled sample introduction system coupled with an analysis device in accordance with example implementations of the present disclosure.

Referring generally to FIGS. 4 and 5, portions of the sample introduction system 106 are shown in accordance with example implementations. The sample introduction system 106 is configured to receive the fluid transferred through the transfer line 104 to prepare the fluid for introduction to the analysis device 108 (e.g., ICP spectroscopy instrumentation, such as ICPAES or ICPMS). The sample introduction system 106 maintains a temperature-controlled environment for the fluid preparation process and the components of the system 100 involved therein. For example, in an implementation, the sample introduction system 106 includes a housing 400 configured to support a heating element 402 which introduces heat into an environment formed by the housing 400. The housing 400 can enclose a pump system (e.g., peristaltic pump 404), a spray chamber, a nebulizer, one or more valves, and associated fluid tubing to receive the fluid from the transfer line 104 and process the sample for introduction to the analysis device 108 through an aperture 406 in a top surface of the housing 400. In an implementation, the heating element 402 includes one or more air intake fans to draw air into the heating element 402, past one or more heating coils, and directed into housing 400 to control a temperature of the enclosed environment. The sample introduction system 106 can include one or more temperature sensors to measure a temperature of the heating element 402, the environment of the housing, or the like, where the temperature sensor can be communicatively coupled with a controller to control operation of the heating element 402 to maintain the sample in the fluid state. For example, an output of the temperature sensor(s) can be transmitted to the controller 110 or another controller to coordinate operation of the heating element 402 to provide a desired temperature of the enclosed environment within the housing 400 and the components contained therein. In an implementation, the housing 400 is sized to provide a gap between the aperture 406 and an input of the analysis device 108 to facilitate gas flow between the sample introduction system 106 and the analysis device 108 (e.g., as shown in FIG. 5).

CONCLUSION

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. A system for controlling a temperature of a fluid-containing sample during transit and handling, the system comprising:
    an autosampler including a temperature-controlled deck to support one or more sample containers configured to hold a sample in a fluid state, the autosampler configured to introduce a probe into the one or more sample containers to remove the sample in the fluid state;
    a heating unit including one or more heating elements to heat one or more fluids to be introduced to the sample removed from the one or more sample containers by the probe or to sample contained within the one or more sample containers;
    a transfer line fluidically coupled with the autosampler to receive the sample in the fluid state from the probe, the transfer line including a wired heating element configured to transfer heat to fluid flowing through the transfer line to maintain the sample in the fluid state, wherein the transfer line includes a fluid line, an outer tube, and an inner tube, wherein the fluid line is contained within the outer tube and is configured to transfer the sample within the fluid line, wherein a first portion of the wired heating element is positioned between the outer tube and the inner tube and a second portion of the wired heating element is positioned between the inner tube and the fluid line; and
    a sample handling system fluidically coupled with the transfer line and configured to fluidically couple with an analysis device, the sample handling system including a housing and a heating element configured to control a temperature of an environment defined by the housing to maintain the sample in the fluid state in at least a portion of the housing.

2. The system of claim 1, wherein the temperature-controlled deck includes one or more heating elements thermally coupled with a surface of the temperature-controlled deck to transfer heat to the one or more sample containers supported by the temperature-controlled deck.

3. The system of claim 2, wherein the temperature-controlled deck defines an aperture in which the one or more heating elements are positioned.

4. The system of claim 3, wherein the temperature-controlled deck includes a cover configured to block access to the aperture when positioned on the temperature-controlled deck.

5. The system of claim 1, wherein the heating unit includes one or more heating blocks housing the one or more heating elements and configured to support fluid lines containing the one or more fluids to be introduced to the sample about an exterior surface of the one or more heating blocks.

6. The system of claim 5, wherein the one or more heating blocks house one or more cartridge heaters.

7. The system of claim 5, wherein the heating unit includes a housing configured to contain at least a portion of the one or more heating blocks.

8. The system of claim 5, wherein the heating unit includes one or more temperature sensors to monitor a temperature of at least one component of the heating unit.

9. The system of claim 8, wherein the one or more temperature sensors are communicatively coupled with a computer controller to control a temperature of fluids within the fluid lines.

10. The system of claim 1, wherein the sampling handling system includes one or more of a pump, a spray chamber, a nebulizer, and a valve within the environment defined by the housing.

11. The system of claim 1, wherein the heating element of the sample handling system includes one or more air intake fans configured to draw air past a heater and into the housing to control the temperature of the environment defined by the housing.

12. The system of claim 1, wherein the sampling handling system includes a temperature sensor configured to measure a temperature of at least one of the heating element of the sample handling system or the environment defined by the housing.

13. The system of claim 12, wherein the temperature sensor is communicatively coupled with a computer controller to control operation of the heating element of the sample handling system to maintain the sample in the fluid state.

14. A method for controlling a temperature of a fluid-containing sample during transit and handling, the method comprising:
    heating a sample held in a sample container positioned on a deck of an autosampler to maintain the sample in a fluid state;
    removing, via a sample probe, the sample in the fluid state from the sample container;
    introducing the sample in the fluid state from the sample probe to a transfer line in fluid communication with the sample probe;
    transferring the sample in the fluid state through the transfer line to a sample handling system;
    heating the transfer line during transfer of the sample to maintain the sample in the fluid state during transfer from the autosampler to the sample handling system, the transfer line including a wired heating element configured to transfer heat to fluid flowing through the transfer line to maintain the sample in the fluid state, wherein the transfer line includes a fluid line, an outer tube, and an inner tube, wherein the fluid line is contained within the outer tube and is configured to transfer the sample within the fluid line, wherein a first portion of the wired heating element is positioned between the outer tube and the inner tube and a second portion of the wired heating element is positioned between the inner tube and the fluid line;
    heating an environment defined by a housing of the sample handling system while the sample is received from the transfer line in the fluid state; and
    transferring the sample from the housing of the sample handling system to an analysis device for analytic determination of one or more components in the sample.

15. The method of claim 14, wherein the sample includes an edible oil.

16. The method of claim 14, further comprising heating a fluid prior to introduction of the fluid to the sample to form a mixed sample in the fluid state.

17. The method of claim 16, wherein the fluid is introduced to the sample subsequent to removing the sample from the sample container.

18. The method of claim 16, wherein the fluid is introduced to the sample in the sample container positioned on the deck of the autosampler.

* * * * *